US008559430B2

(12) United States Patent  
Miyoshi

(10) Patent No.: US 8,559,430 B2  
(45) Date of Patent: Oct. 15, 2013

(54) NETWORK CONNECTION DEVICE, SWITCHING CIRCUIT DEVICE, AND METHOD FOR LEARNING ADDRESS

(75) Inventor: Takashi Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 688 days.

(21) Appl. No.: 12/751,413

(22) Filed: Mar. 31, 2010

(65) Prior Publication Data

US 2010/0260183 A1   Oct. 14, 2010

(30) Foreign Application Priority Data

Apr. 13, 2009  (JP) ................................ 2009-097404

(51) Int. Cl.  
*H04L 12/28* (2006.01)

(52) U.S. Cl.  
USPC .......................................... 370/392; 370/401

(58) Field of Classification Search  
USPC .......................................... 370/392, 351, 401  
See application file for complete search history.

(56) References Cited

U.S. PATENT DOCUMENTS

| | | | | |
|---|---|---|---|---|
| 5,909,686 | A * | 6/1999 | Muller et al. ......................... | 1/1 |
| 6,310,874 | B1 * | 10/2001 | Miller et al. ................... | 370/379 |
| 6,762,995 | B1 * | 7/2004 | Drummond-Murray et al. ............... | 370/229 |
| 7,660,259 | B1 * | 2/2010 | Grosser et al. ................ | 370/252 |
| 8,040,872 | B2 * | 10/2011 | Saito et al. ..................... | 370/351 |
| 8,064,456 | B2 * | 11/2011 | Sekido .......................... | 370/392 |
| 2003/0028808 | A1 | 2/2003 | Kameda | |
| 2007/0274234 | A1 * | 11/2007 | Kubota .......................... | 370/254 |
| 2008/0239957 | A1 * | 10/2008 | Tokura et al. .................. | 370/235 |
| 2010/0002702 | A1 * | 1/2010 | Saito et al. ..................... | 370/392 |
| 2011/0149748 | A1 * | 6/2011 | Sasaki .......................... | 370/248 |
| 2012/0020206 | A1 * | 1/2012 | Busi et al. ...................... | 370/217 |

FOREIGN PATENT DOCUMENTS

| | | |
|---|---|---|
| JP | 2000-59393 | 2/2000 |
| JP | 2001-186186 | 7/2001 |
| JP | 2003-46533 | 2/2003 |
| JP | 2004-072633 | 3/2004 |
| JP | 2006-295550 | 10/2006 |

OTHER PUBLICATIONS

Japanese Office Action dispatched on May 17, 2011 for corresponding Japanese Application No. 2009-097404.  
Japanese Office Action for corresponding Japanese Application 2009-097404; dispatched Feb. 1, 2011.

* cited by examiner

*Primary Examiner* — Hassan Kizou  
*Assistant Examiner* — Emmanuel Maglo  
(74) *Attorney, Agent, or Firm* — Staas & Halsey LLP

(57) ABSTRACT

A network connection device includes a processor and a switch unit. The processor learns an address. The switch unit outputs a packet received from a first port out of a plurality of ports to a second port. The switch unit manages a table including an entry which includes an address, status data, and an identifier of a port. The switch unit generates a first entry including a first address included in a first packet received via a first port, status data indicating "learning", and an identifier of the first port, in the absence of the first address in the table, and requests the processor to learn the first address. The switch unit withholds requesting the processor to learn a second address included in a second packet received via the first port, when the second address is included in a second entry along with status data indicating "learning".

7 Claims, 13 Drawing Sheets

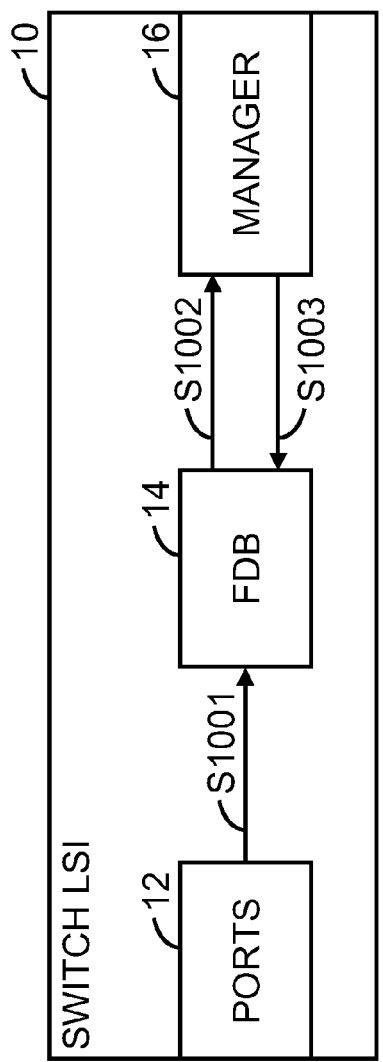
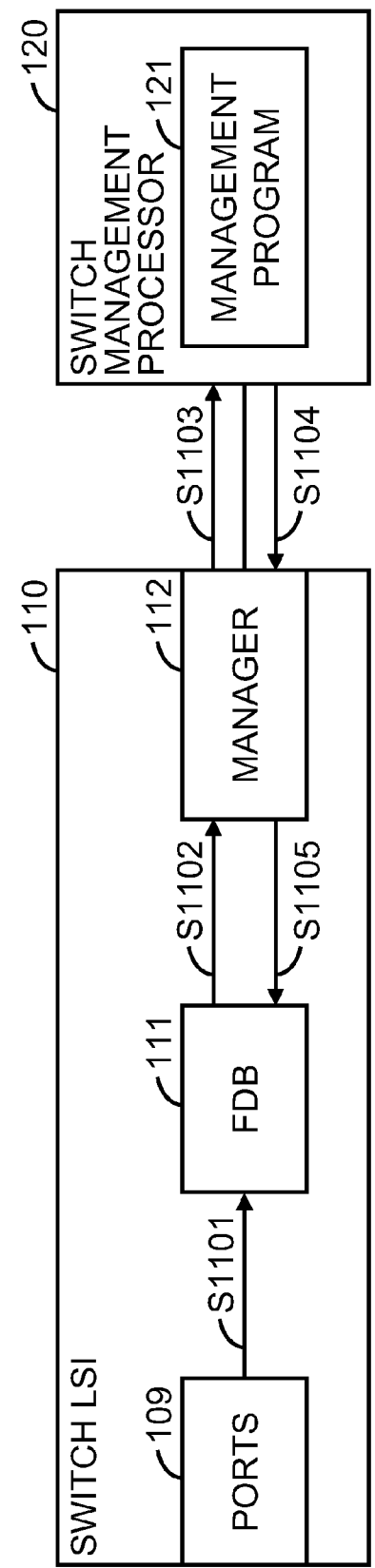
FIG. 1  Related Art
FIG. 2

NETWORK CONNECTION DEVICE, SWITCHING CIRCUIT DEVICE, AND METHOD FOR LEARNING ADDRESS

CROSS-REFERENCE TO RELATED APPLICATION

This application is based upon and claims the benefit of priority of the prior Japanese Patent Application No. 2009-097404, filed on Apr. 13, 2009, the entire contents of which are incorporated herein by reference.

FIELD

The embodiments discussed herein are related to a technique for learning an address in a network connection device such as a switch.

BACKGROUND

Conventionally, in a layer 2 (L2) switch, address learning for registering a source address (SA) in a forwarding database (FDB) is performed by switch hardware. FIG. 1 is a diagram illustrating an example of related art. As illustrated in FIG. 1, a switch large scale integrated circuit (LSI) 10, which is switch hardware, includes ports 12, an FDB 14, and a manager 16.

In operation S1001, the switch LSI 10 searches the FDB 14 by a source address (SA) of a packet received via the ports 12.

In operation S1002, the switch LSI 10 transmits a search result to the manager 16.

In operation S1003, when the SA has not been registered in the FDB 14, the manager 16 registers the SA in the FDB 14.

The manager included in such a switch LSI may only perform simple registration of an SA, and may not be able to handle a case in which filtering by a sophisticated process such as authentication is required. The case in which filtering by a sophisticated process is required includes a case in which a virtual local area network (VLAN) of a received packet is at variance with a VLAN identifier (ID) of an address to be registered, a case in which a plurality of entries having different VLAN IDs are required for registering an SA of a received packet, and a case in which an address conversion is required for a port of different domain.

A technique for performing address learning in such hardware includes a technique in which time necessary for packet transfer is determined on the basis of a length of a packet, actual time for determining a transfer destination is measured, and whether an additional process such as media access control (MAC) address learning should be performed or not is determined in accordance with a time difference between the time necessary for packet transfer and the actual time for determining a transfer destination. In this way, packet losses may decrease, and a system of lower cost and higher cost performance may be constituted, comparing with a case in which an additional process such as MAC address learning is performed for every packet. Furthermore, in that technique, address learning is not concentrated on specific addresses, but the address learning is efficiently performed.

SUMMARY

A network connection device includes a processor and a switch unit. The processor learns an address. The switch unit manages a table including an entry. The entry includes an address of a device connected to a port out of a plurality of ports, status data indicating whether the address has been learned, and an identifier of the port. The switch unit outputs a packet received from a first port out of the plurality of ports to a second port. The switch unit generates a first entry of the table in the absence of a first address in the table. The first address is included as a source address in a first packet received from a first port. The first entry includes the first address, first status data indicating that the processor is learning the first address, and a first identifier of the first port. The switch unit requests the processor to learn the first address in the absence of the first address in the table. The switch unit withholds requesting the processor to learn a second address upon receiving a second packet from the first port. The second packet includes the second address as a source address. The second address is included, along with second status data indicating that the processor is learning the second address, in a second entry of the table. The switch unit updates the first status data to indicate that the processor has learned the first address, in response to a request from the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of related art;

FIG. 2 is a diagram illustrating an example of a configuration of an L2 switch according to the present invention;

DESCRIPTION OF EMBODIMENTS

Figure 3:
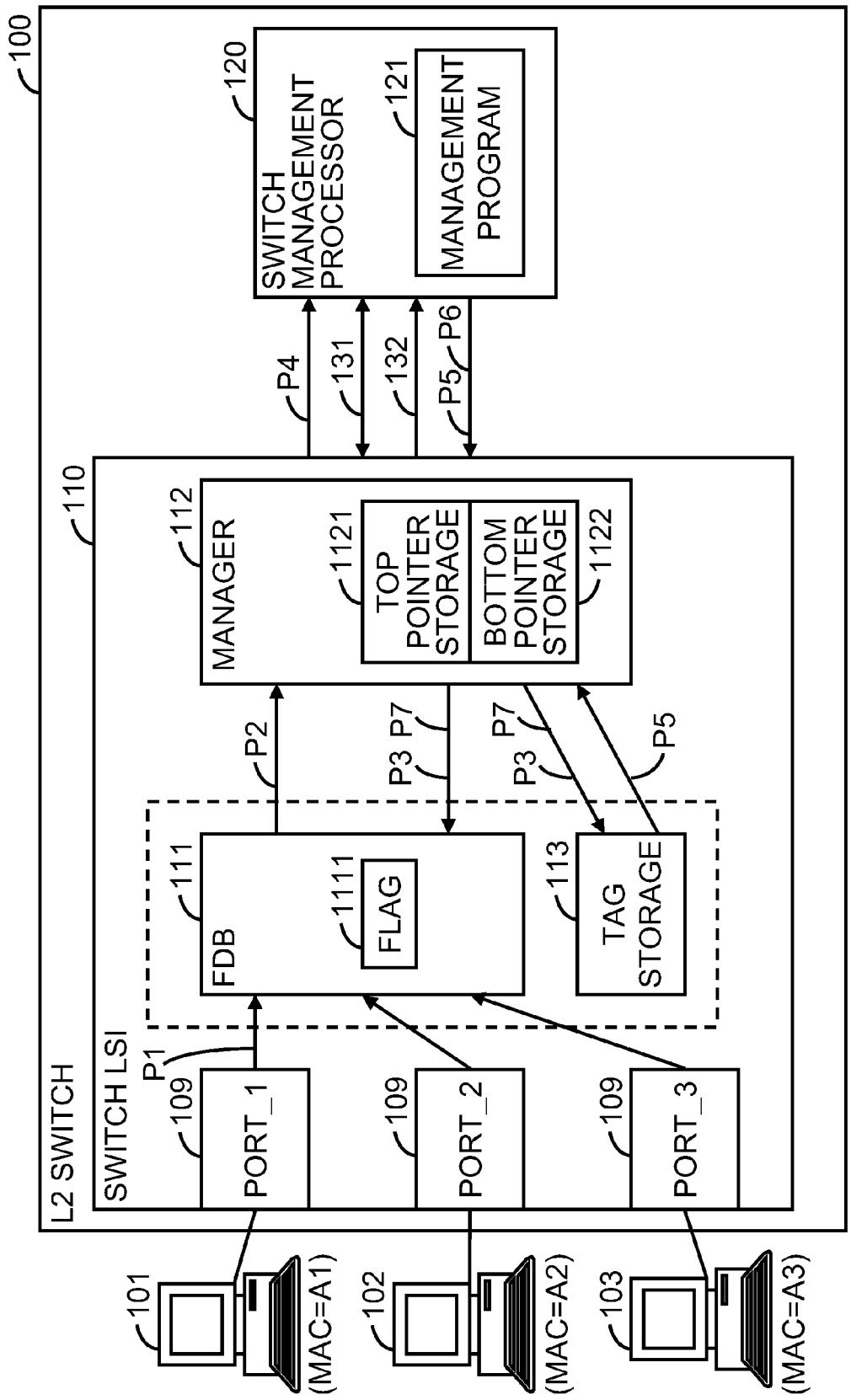
FIG. 3 is a diagram illustrating an example of a detailed configuration of an L2 switch according to the present invention.

Various address learning may not be performed only by hardware. Even when introducing address learning by software, it is still difficult to solve all the problems.

It is preferable to perform address learning appropriately by software in a network connection device such as a switch.

As discussed above, a high-level address learning including a MAC VLAN authentication and flexible address learning in which learning and no learning are switched to each other or content to be learned is changed may not be realized only by the hardware of L2 switch. For which, considered is a configuration including a switch LSI and a switch management processor for executing a management program for performing various address learning.

FIG. 2 is a diagram illustrating an example of a configuration of an L2 switch according to the present invention. The switch LSI 110 illustrated in FIG. 2 includes a plurality of ports 109, an FDB 111, and a manager 112. The switch LSI 110 is connected to a switch management processor 120 through a communication path (bus or network). The switch management processor 120 runs an operating system (OS) and also runs a management program 121 on the OS.

In operation S1101, the switch LSI 110 searches the FDB 111 is by a source address (SA) of a packet received via the ports 109.

In operation S1102, the switch LSI 110 notifies the manager 112 of the search result.

In operation S1103, when the SA has not been registered in the FDB 111, the manager 112 interrupts the switch management processor 120 for request learning the SA.

Thereafter, the manager 112 of the switch LSI 110 transfers information such as the SA and contents registered in the FDB 111 to the switch management processor 120.

In operation S1104, the switch management processor 120 performs address learning by executing the management program 121 using the data transferred as discussed above. As a result, the switch management processor 120 outputs a request for registering the SA in the FDB or discarding the SA to the manager 112 of the switch LSI 110.

In operation S1105, the manager 112 of the switch LSI 110 registers the SA in the FDB or discards the SA in response to the request from the switch management processor 120.

The address learning discussed above, in which a switch management processor 120 learns an SA by executing a management program 121, a latency between operation S1102 and operation S1105 is large, so that the learning throughput decreases. When packets including an SA which has not been registered in the FDB 111 continue to be received, the learning may not catch up with receipt of packets, and some packets may not be learned. To solve this problem, the succeeding search results may be masked or queued. When masking the search results, a new request for learning an address is discarded and no new learning occurs. When the search results are simply queued, requests for learning the same SA may be continuously added to the queue. In this case, a resource including the communication band between the switch LSI 110 and the switch management processor 120 is uselessly consumed, so that a problem occurs in which the throughput progressively decreases.

As discussed above, the address learning may not be appropriately performed simply by using the switch management processor in addition to the switch LSI to execute the management program for performing the address learning.

Hereinafter, a configuration for solving such a specific problem will be discussed.

FIG. 3 is a diagram illustrating an example of a detailed configuration of an L2 switch according to the present invention. An L2 switch 100 includes a switch LSI 110 and a switch management processor 120 connected with the switch LSI 110 via a communication path 131 and an interrupt signal line 132. The switch LSI 110 includes ports 109 (Port_1 to Port_3 in FIG. 3) connected to a terminal device or the like (terminals 101 to 103 in FIG. 3), an FDB 111 connected to the ports 109, a manager 112 connected to the FDB 111. The tag storage 113 is connected to the manager 112 and functions as a queue for controlling a sequence of address learning. As discussed below, the FDB 111 and the tag storage 113 may be integrated together as illustrated by a broken line in FIG. 3. The FDB 111 includes a learning status flag 1111 for indicating whether the address learning is being performed, as discussed below. The manager 112 includes a top pointer storage 1121 for storing a top pointer and a bottom pointer storage 1122 for storing a bottom pointer. The top pointer storage 1121 and the bottom pointer storage 1122 function, along with the tag storage 113, as a queue for controlling the sequence of address learning. The switch management processor 120 executes a management program 121 on the OS.

Figure 4:
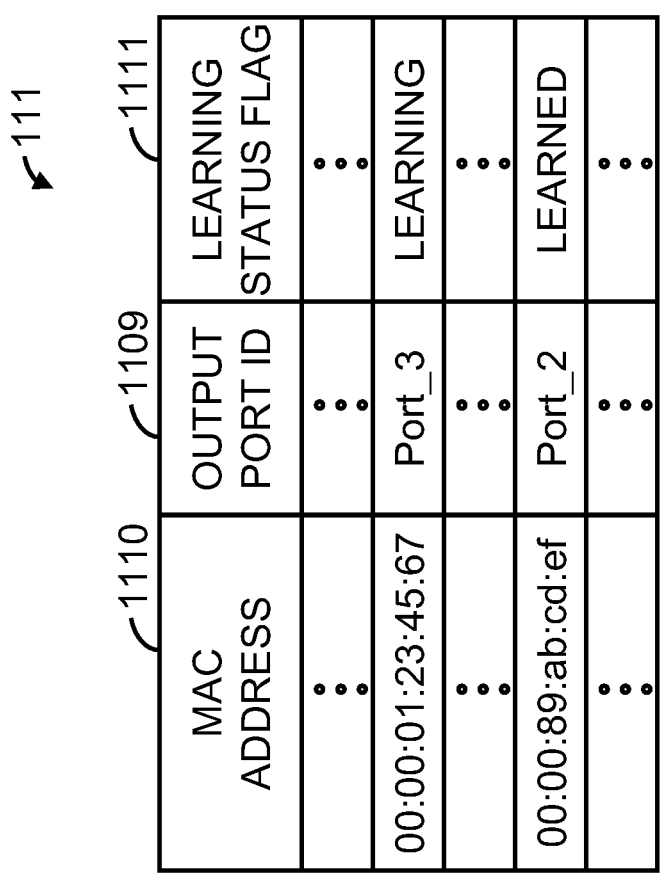
FIG. 4 is a diagram illustrating an example of a data configuration of an FDB according to the present invention.

FIG. 4 is a diagram illustrating an example of a data configuration of an FDB according to the present invention. As illustrated in FIG. 4, the FDB 111 is a table capable of storing one or more entries. Each entry includes a MAC address 1110 as a search key, an output port ID 1109 of a port to which a device having the MAC address is connected, and a learning status flag 1111 for indicating whether the MAC address is being learned or has already been learned. Hereinafter, location of an entry is referred to as an index.

By using such an FDB 111, redundant requests for address learning may be filtered as discussed below. Upon receiving a new SA, the switch LSI 110 generates a new entry of the FDB 111, and sets the learning status flag 1111 of the new entry to "LEARNING". Upon receiving a request for updating an entry from the switch management processor 120 as a result of address learning, the switch LSI 110 updates the learning status flag 1111 to "LEARNED", and thereafter a packet transfer based on the entry is enabled. Upon receiving a request for deleting an entry from the switch management processor 120, the switch LSI 110 deletes a specified entry.

Specifically, upon receiving a packet, which corresponds to a MAC frame, from the ports 109, the switch LSI 110 searches the FDB 111 by an SA, which corresponds to a source MAC address, of the packet. When a corresponding entry is not present in the FDB 111, a new entry including a learning status flag 111 indicating "LEARNING" is generated, and the address learning is performed. When the corresponding entry is present and the learning status flag 1111 of the corresponding entry indicates "LEARNING", the request for learning an address is withheld because further address learning is not necessary. Thus, redundant address learning may be filtered to improve the throughput of address learning. When the learning status flag 1111 indicates "LEARNED", the address learning is not necessary as usual.

Upon receiving a packet from the ports, the switch LSI 110 also searches the FDB 111 by a destination address (DA), which corresponds to a destination MAC address. When the corresponding entry is not present, the switch LSI 110 broadcasts the packet to all the ports. When the corresponding entry is present and the learning status flag 1111 of the corresponding entry indicates "LEARNING", the switch LSI 110 broadcasts the packet to all the ports as in the case where the corresponding entry is not present. In other words, each device connected to the ports determines whether the destination of the packet is the device itself. When the corresponding entry is present and the learning status flag 1111 indicates "LEARNED", the switch LSI 110 transfers the packet to the corresponding port as usual.

Figure 5:
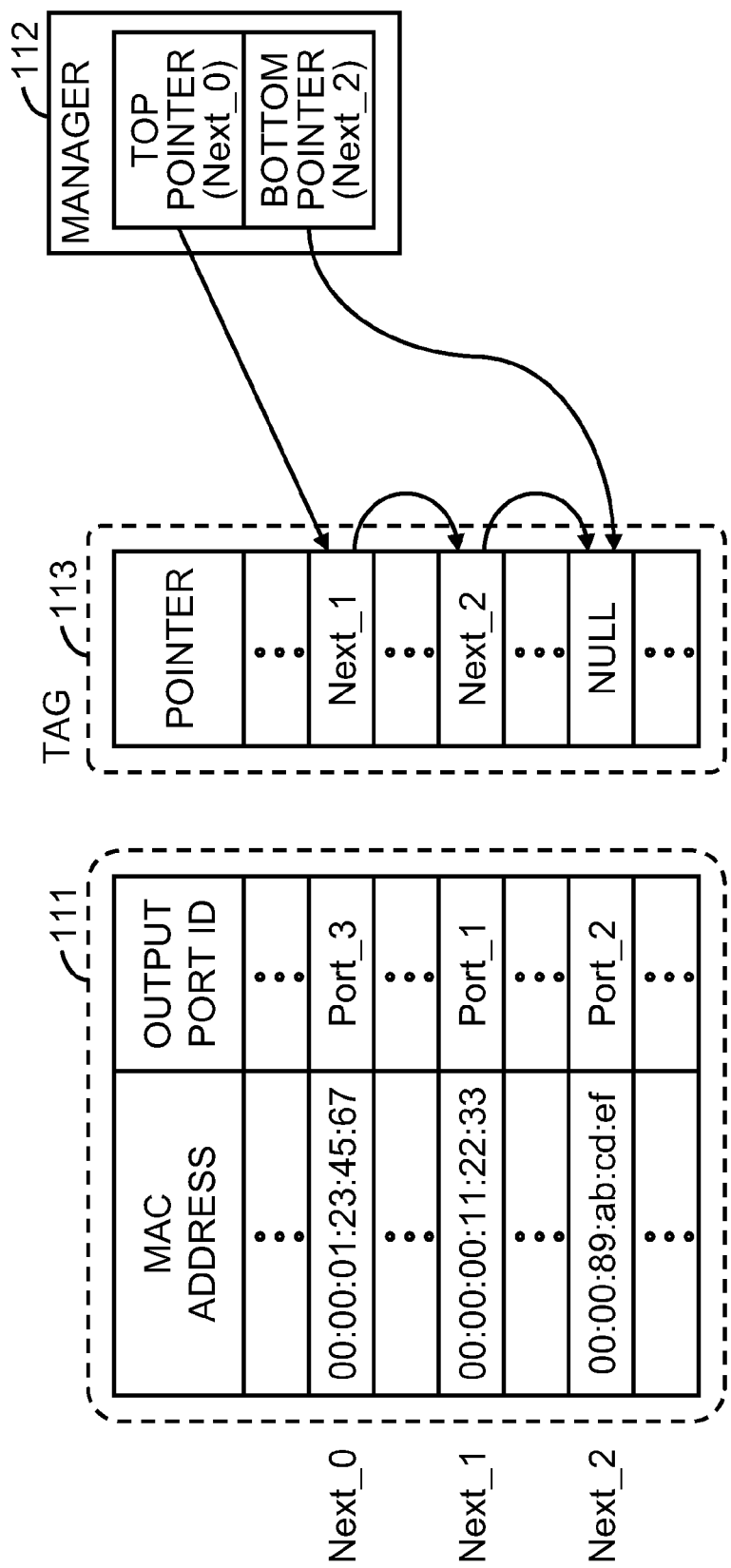
FIG. 5 is a diagram illustrating an example of a queue in a switch according to the present invention.

FIG. 5 is a diagram illustrating an example of a queue in a switch according to the present invention. The queue for controlling the sequence of the address learning will be discussed with reference to FIG. 5. The tag storage 113 stores pointers corresponding to entries of the FDB 111. The pointer points to an entry for an SA to be learned next. In the example in FIG. 5, the pointer corresponding to the entry at index Next_0 holds the index Next_1 of an entry for an SA to be learned next. The pointer corresponding to the entry at index Next_1 holds the index Next_2 of an entry for an SA for to be learned next. The pointer corresponding to the entry at index Next_2 holds "NULL" because there is no SA to be learned next. Although it is not illustrated in FIG. 5, a pointer corresponding to an entry including a learning status flag 1111 indicating "LEARNED" is not used, in other words, handled as "don't care".

The manager 112 manages a top pointer (Next_0 in FIG. 5) that points to an entry of the FDB 111, which includes an SA to be learned first. The manager 112 also manages a bottom pointer (Next_2 in FIG. 5) that points to an entry of the FDB 111, which includes an SA to be learned last.

As discussed above, the entries to be learned, which have been registered in the FDB 111, are managed in a queue structure to achieve efficient access from the switch management processor 120. An access from the switch management processor 120 is limited to the top entry in the queue structure for learning, thus an access overhead may be reduced, and operation performance may increase.

The size of the FDB 111 limits the number of addresses which may be learned (in other words, a total number of learned entries and entries to be learned is less than or equals to a capacity of the FDB 111), so that it may be efficient to provide tags (pointer areas) in association with each entry of the FDB 111. When the tag storage 113 is provided in the FDB 111, free spaces in the FDB 111 may be used more efficiently.

Operations of the L2 switch 100 illustrated in FIG. 3 will be discussed.

In operation P1, when a terminal 101 is connected to the Port_1 and the Port_1 receives a packet from the terminal 101, the switch LSI 110 searches the FDB 111 by an SA (MAC address=A1) of the terminal 101.

In operation P2, the switch LSI 110 notifies the manager 112 of the search result.

In operation P3, when the search result indicates that the SA has not been registered in the FDB 111, the manager 112 generates a new entry of the FDB 111 for the SA. The learning status flag 1111 of the new entry is set to "LEARNING". The top pointer storage 1121 and the bottom pointer storage 1122 of the manager 112 and the tag storage 113 are updated as necessary to register the new entry in the queue.

In operation P4, the manager 112 interrupts the switch management processor 120 via the interrupt signal line 132 when the size of the queue is one or more.

In operation P5, when interrupted, the switch management processor 120 accesses, by executing the management program 121, the manager 112 of the switch LSI 110 to identify the top entry of the queue. Then, the switch management processor 120 obtains data of the top entry of the queue via the communication path 131 to perform predetermined operations for the address learning.

In operation P6, as a result of the predetermined address learning performed by executing the management program 121, the switch management processor 120 outputs a request for updating an entry to the manager 112 of the switch LSI 110 when the SA of the top entry of the queue may be registered, and outputs a request for deleting an entry to the manager 112 of the switch LSI 110 when the SA of the top entry of the queue must not be registered.

In operation P7, the manager 112 updates the learning status flag 1111 of the entry to "LEARNED" when the request from the switch management processor 120 is for updating the entry. The manager 112 deletes the entry of the FDB 111 when the request is for deleting the entry.

The switch management processor 120 repeats the operations P5 to P7 until the queue becomes empty.

By performing the operations discussed above, the address learning may be performed without omission and without useless operations.

Figure 6:
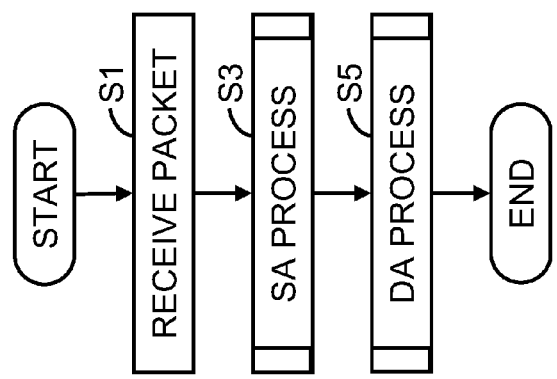
FIG. 6 is a diagram illustrating an example of an operation flow of an L2 switch according to the present invention.

Hereinafter, details of operations of the L2 switch 100 will be discussed with reference to FIGS. 6 to 19. FIG. 6 is a diagram illustrating an example of an operation flow of an L2 switch according to the present invention.

In operation S1, one of the ports 109 (Port_1 to Port_3) receives a packet from one of the terminals 101 to 103.

In operation S3, the L2 switch 100 performs an SA process for the SA of the received packet. This process will be discussed below in detail.

In operation S5, the L2 switch 100 performs a DA process for the DA of the received packet. The DA process is a process for determining how to transfer the received packet. The DA process will be discussed below in detail. These operations discussed above are performed every time a packet has been received.

Figure 7A:
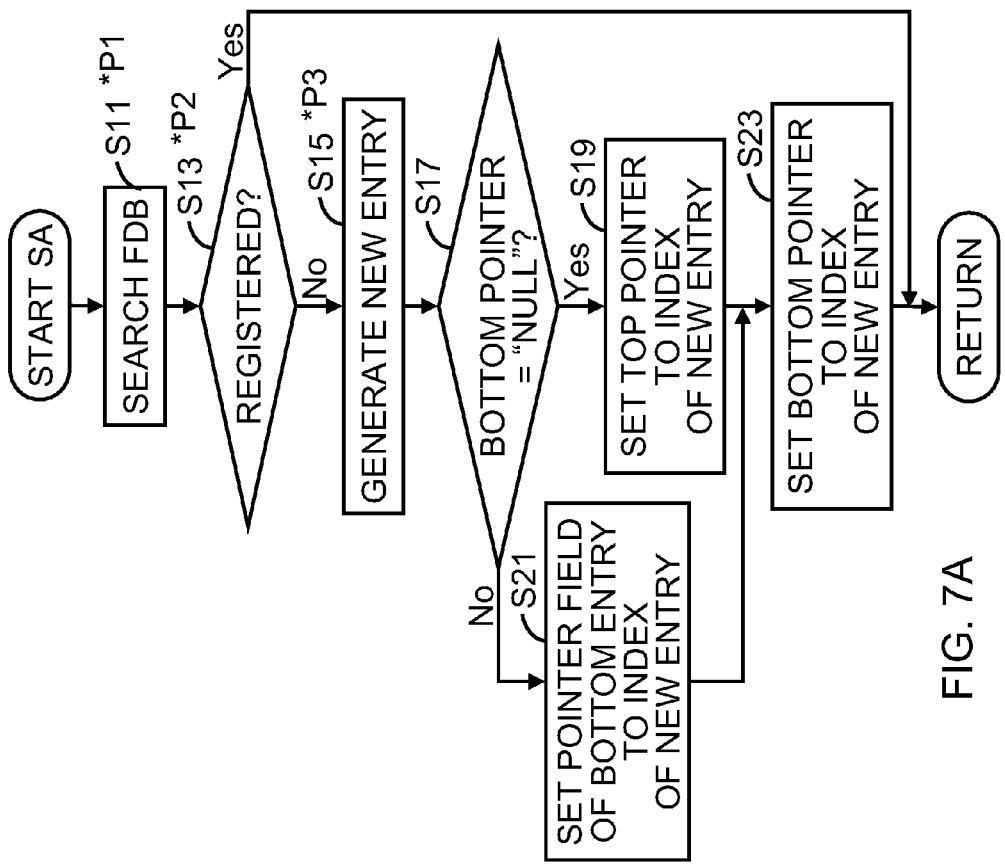
FIG. 7A is a diagram illustrating an example of an operation flow of an SA process according to the present invention.

FIG. 7A is a diagram illustrating an example of an operation flow of an SA process according to the present invention. The SA process will be discussed with reference to FIG. 7A.

In operation S11, the switch LSI 110 searches the FDB 111 by the SA of the received packet. This operation corresponds to operation P1 in FIG. 3, and hence the operation is accompanied with *P1 in FIG. 7A.

In operation S13, the switch LSI 110 determines whether the SA of the received packet has been registered in the FDB 111. This operation corresponds to operation P2 in FIG. 3. When the SA has been registered in the FDB 111 ("Yes" in operation S13), the address learning for the SA is not performed even when the learning status flag 1111 of the entry of the SA indicates "LEARNING" or "LEARNED". When the learning status flag 1111 indicates "LEARNING", redundant address learning may be avoided, and when the learning status flag 1111 indicates "LEARNED", the learning may not be necessary, so that the switch LSI 110 returns the process to the operation flow illustrated in FIG. 6 without doing anything more.

Figures 7B, 8:
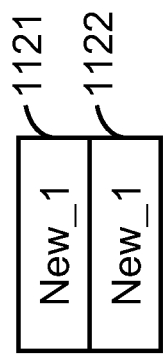
FIG. 7B is a diagram illustrating an example of a state of an FDB and a tag storage in an SA process according to the present invention.
FIG. 8 is a diagram illustrating an example of a state of a top pointer storage and a bottom pointer storage in an SA process according to the present invention.

In operation S15, when the SA has not been registered in the FDB 111 ("No" in operation S13), the manager 112 generates a new entry (MAC address=SA, learning status flag="LEARNING", pointer corresponding to the entry in the tag storage="NULL") at the index=New_1 in the FDB 111. This operation corresponds to operation P3 in FIG. 3. FIG. 7B is a diagram illustrating an example of a state of an FDB and a tag storage in an SA process according to the present invention. The FDB 111 the tag storage 113 become a state as illustrated in FIG. 7B.

In operation S17, The manager 112 determines whether the bottom pointer holds "NULL". When the bottom pointer holds "NULL", there is no entry to be learned in the queue, and the new entry becomes a top entry.

In operation S19, when the bottom pointer holds "NULL" ("Yes" in operation S17), the manager 112 sets the top pointer to the index New_1 of the new entry. Thereafter, the switch LSI 110 advances the process to operation S23.

In operation S21, when the bottom pointer does not hold "NULL" ("No" in operation S17), the new entry needs to be added to the bottom of the queue because there are some entries to be learned in the queue. Therefore, the manager 112 sets a pointer, stored in a corresponding field of the tag storage 113, corresponding to an entry pointed to by the bottom pointer to the index New_1 of the new entry. In this way, the added entry is registered at the bottom of the queue. Thereafter, the switch LSI 110 advances the process to operation S23.

In operation S23, the manager 112 sets the bottom pointer to the index New_1 of the new entry. Thereafter, the switch LSI 110 returns the process to the operation flow illustrated in FIG. 6.

Figure 9:
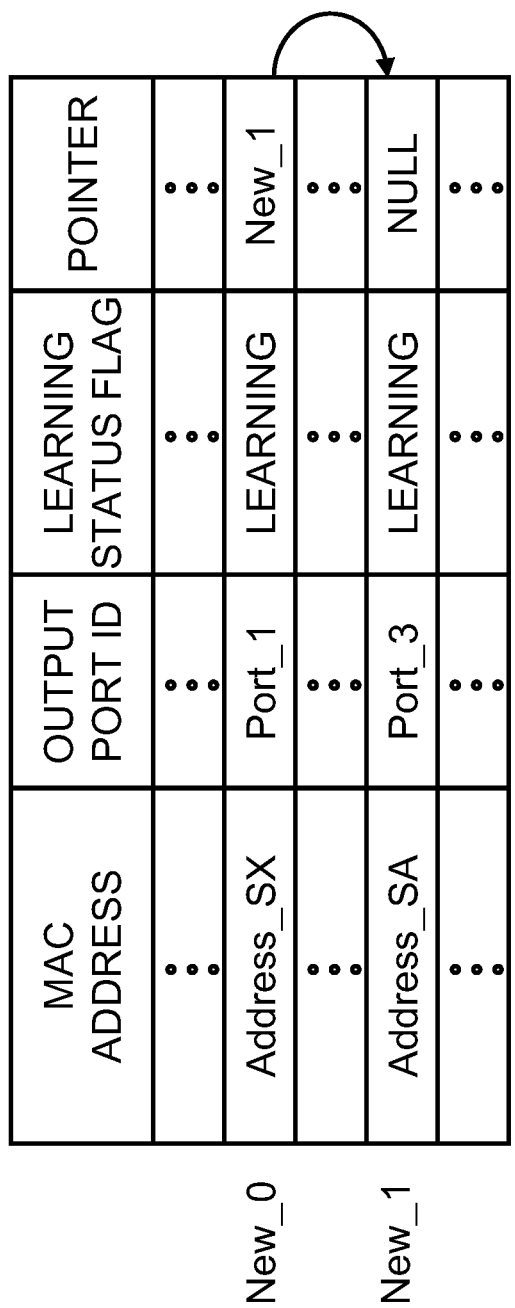
FIG. 9 is a diagram illustrating an example of a state of an FDB and a tag storage in an SA process according to the present invention.
Figure 10:
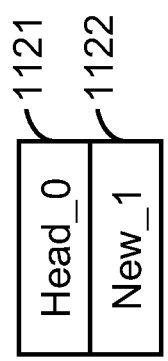
FIG. 10 is a diagram illustrating an example of a state of a top pointer storage and a bottom pointer storage in an SA process according to the present invention.

FIG. 8 is a diagram illustrating an example of a state of a top pointer storage and a bottom pointer storage in an SA process according to the present invention. When performing operations S19 and S23, as illustrated in FIG. 8, the index New_1 is registered in the top pointer storage 1121 and the bottom pointer storage 1122. FIG. 9 is a diagram illustrating an example of a state of an FDB and a tag storage in an SA process according to the present invention. When operations S21 and S23 are performed, the manager 112 sets, as illustrated in FIG. 9, the pointer, stored in a corresponding field of the tag storage 113, corresponding to an entry which has been the bottom entry, at the index New_0 in the FDB 111 to the index New_1 of the new entry. FIG. 10 is a diagram illustrating an example of a state of a top pointer storage and a bottom pointer storage in an SA process according to the present invention. As illustrated in FIG. 10, the top pointer stored in the top pointer storage 1121 holds an index Head_0 of a top entry, and the manager 112 sets the bottom pointer storage 1122 to the index New_1 of the new entry.

In this way, when the switch LSI 110 has received a packet including an SA which has not been registered, the switch LSI 110 generates a new entry of the FDB 111, and puts the new entry at the bottom of the queue.

Figure 11:
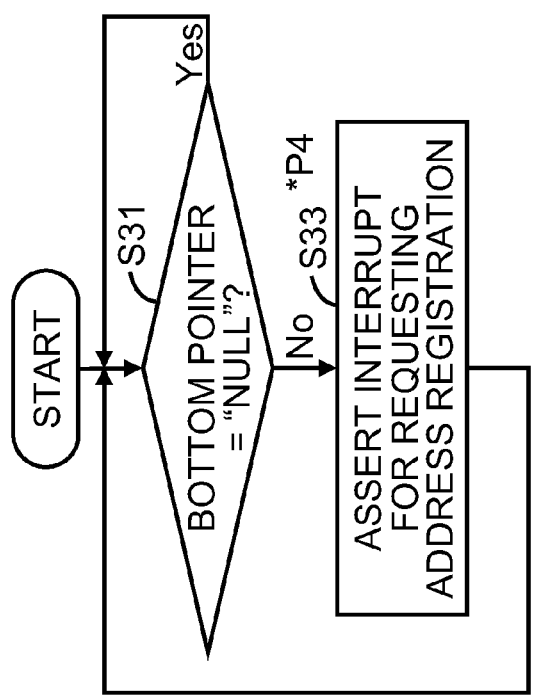
FIG. 11 is a diagram illustrating an example of an operation flow of a process of asserting an interrupt executed by a manager of a switch LSI according to the present invention.

FIG. 11 is a diagram illustrating an example of a process of asserting an interrupt executed by a manager of a switch LSI according to the present invention. A process of asserting an interrupt executed by the manager 112 which monitors the bottom pointer storage 1122 will be discussed with reference to FIG. 11.

In operation S31, the manager 112 monitors the bottom pointer storage 1122, and determines whether the bottom pointer holds "NULL".

When the bottom pointer holds "NULL" ("Yes" in operation S31), there is no address to be learned, so that the manager 112 waits until the bottom pointer is set to an index.

In operation S33, when the bottom pointer holds an index ("No" in operation S31), the manager 112 asserts an interrupt for requesting address registration to the switch management processor 120. This operation corresponds to operation P4 in FIG. 3. Thereafter, the switch LSI 110 returns the process to operation S31.

In this way, when the bottom pointer is registered, the manager 112 asserts an interrupt for requesting address registration to the switch management processor 120, and the switch management processor 120 starts the address learning.

Figure 12:
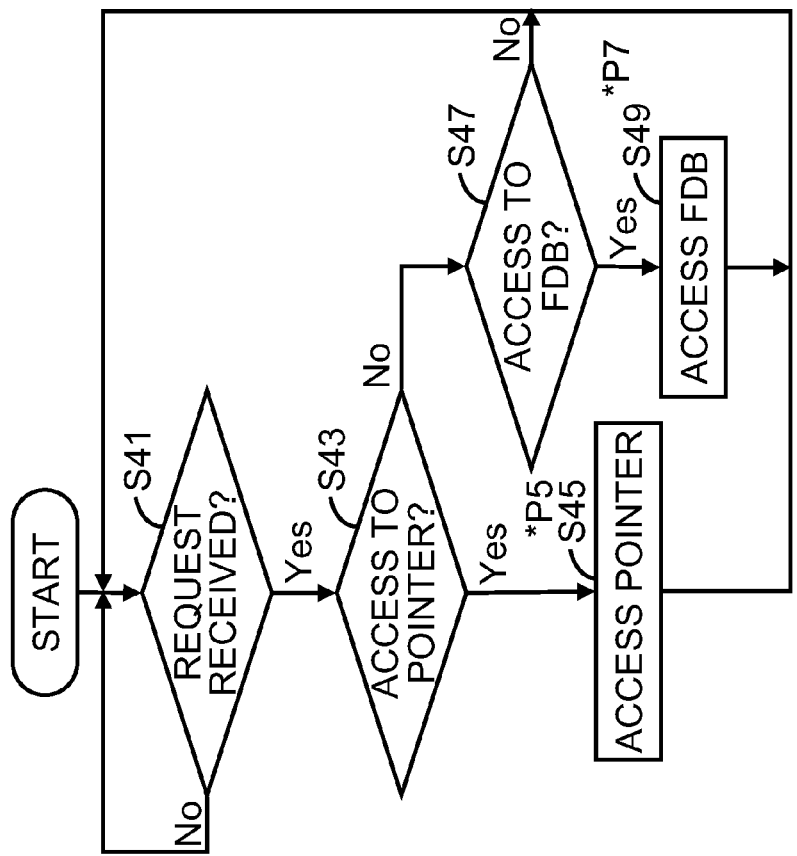
FIG. 12 is a diagram illustrating an example of an operation flow of a process of accessing internal data executed by a manager of a switch LSI according to the present invention.

FIG. 12 is a diagram illustrating an example of a process of accessing internal data executed by a manager of a switch LSI according to the present invention. The manager 112 performs operations discussed below in response to a request from the switch management processor 120.

In operation S41, the manager 112 determines whether the manager 112 has received a request from the switch management processor 120. When it is determined that the manager 112 has not received a request ("No" in operation S41), the manager 112 waits for a request.

In operation S43, when the manager 112 has received a request from the switch management processor 120 ("Yes" in operation S41), the manager 112 determines whether the request is a request for accessing a pointer (specifically, the top pointer or the bottom pointer) managed by the manager 112.

In operation S45, when the request is a request for accessing (read/write) a pointer managed by the manager 112 ("Yes" in operation S43), the manager 112 accesses the requested pointer, and outputs the access result to the switch management processor 120. This operation is, for example, a part of operation P5 in FIG. 3. Thereafter, the switch LSI 110 returns the process to operation S41.

In operation S47, when the request is not a request for accessing a pointer managed by the manager 112 ("No" in operation S43), the manager 112 determines whether the request is a request for accessing the FDB 111. When the request is not a request for accessing the FDB 111 ("No" in operation S47), the switch LSI 110 returns the process to operation S41.

In operation S49, when the request is a request for accessing the FDB 111 ("Yes" in operation S47), the manager 112 accesses the FDB 111 in response to the request, and outputs the access result to the switch management processor 120. For example, the manager 112 may read data of an entry in response to a request to read data of the entry and outputs the data to the switch management processor 120. The manager 112 may change the learning status flag of an entry in response to a request. The manager 112 may delete an entry. This operation is a part of operation P7 in FIG. 3. After operation S49, the switch LSI 110 returns the process to operation S41.

In this way, the manager 112 also operates as an interface with the switch management processor 120.

Figure 13:
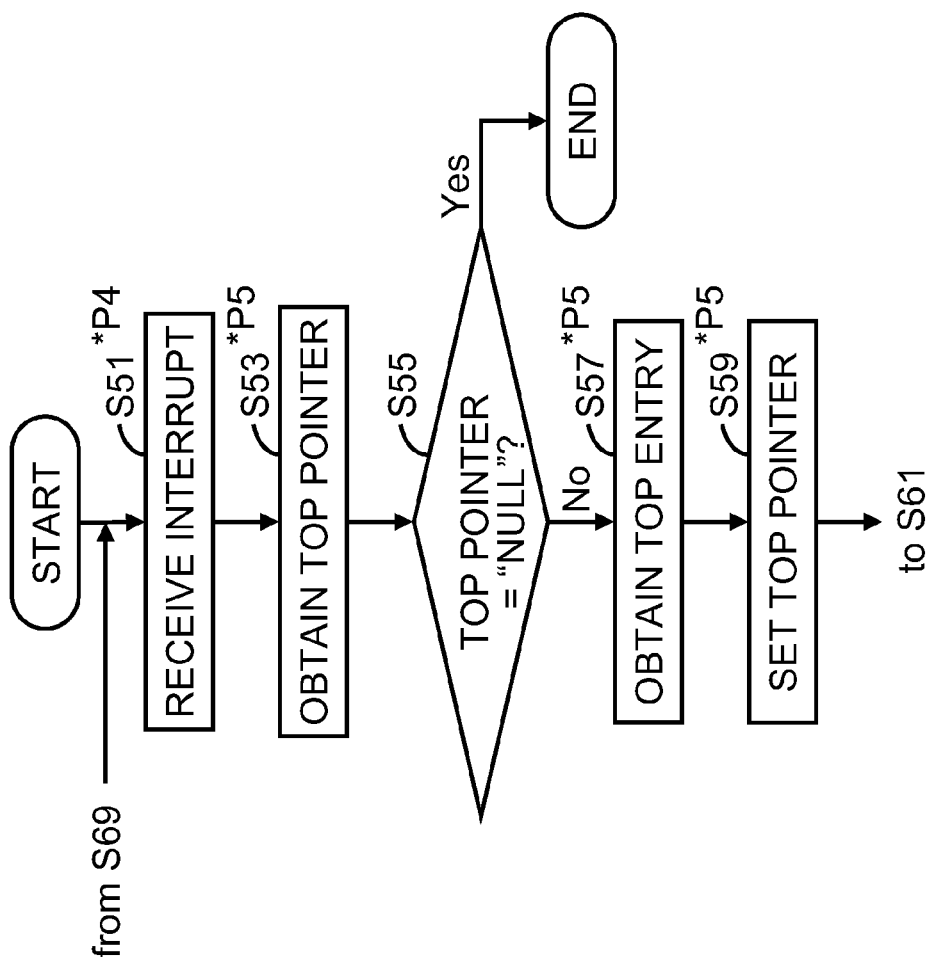
FIGS. 13 and 14 are parts of a diagram illustrating an example of an operation flow of a process of address registration executed by a switch management processor according to the present invention.
Figure 14:
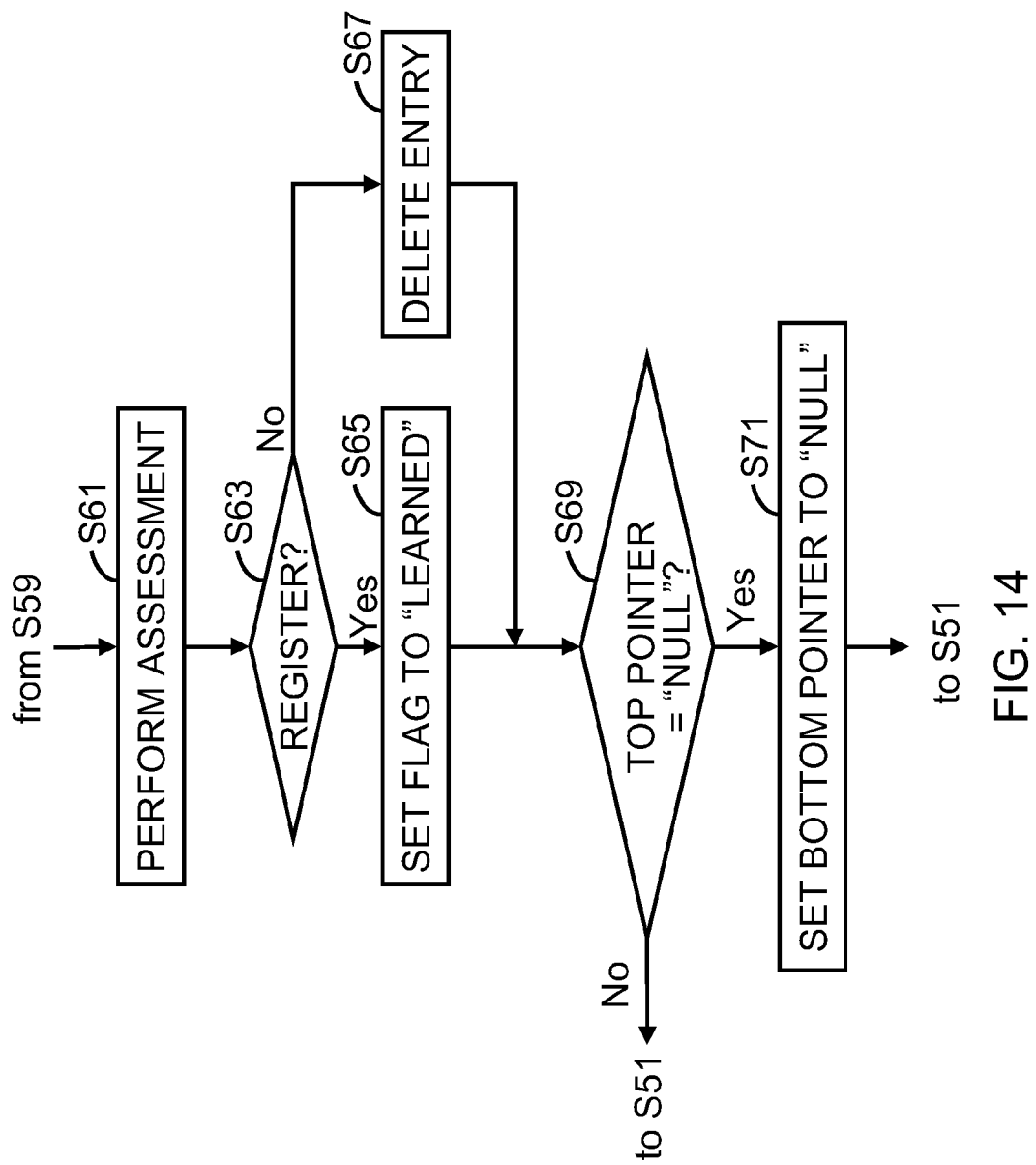

Operations of the switch management processor 120 performed by executing the management program 121 will be discussed with reference to FIGS. 13 to 18. FIGS. 13 and 14 are parts of a diagram illustrating an example of an operation flow of a process of address registration executed by a switch management processor according to the present invention.

In operation S51, the switch management processor 120 receives the interrupt for requesting address registration from the switch LSI 110 via the interrupt signal line 132. This operation corresponds to operation P4 in FIG. 3.

In operation S53, the switch management processor 120 executing the management program 121 instructs the manager 112 of the switch LSI 110 to read the top pointer, and obtains the top pointer from manager 112 of the switch LSI 110. This operation corresponds to operation P5 in FIG. 3, and relates to operation S45 in FIG. 12.

In operation S55, the switch management processor 120 determines whether the top pointer holds "NULL". This operation is to check whether to terminate the process, and is enabled when the process returns from the successive operations. Of course, the top pointer does not hold "NULL" at first. When the top pointer holds "NULL" ("Yes" in operation S55), the switch management processor 120 terminates the process.

In operation S57, when the top pointer does not hold "NULL" ("No" in operation S55), the switch management processor 120 instructs the manager 112 to read the entry pointed to by the top pointer (for example, index Head_1), and obtains data of the entry pointed to by the top pointer from the manager 112 of the switch LSI 110. At the same time, the switch management processor 120 also obtains the pointer stored in the corresponding field of the tag storage 113. This operation corresponds to a part of operation P5 in FIG. 3, and relates to operation S49 in FIG. 12.

Figure 15:
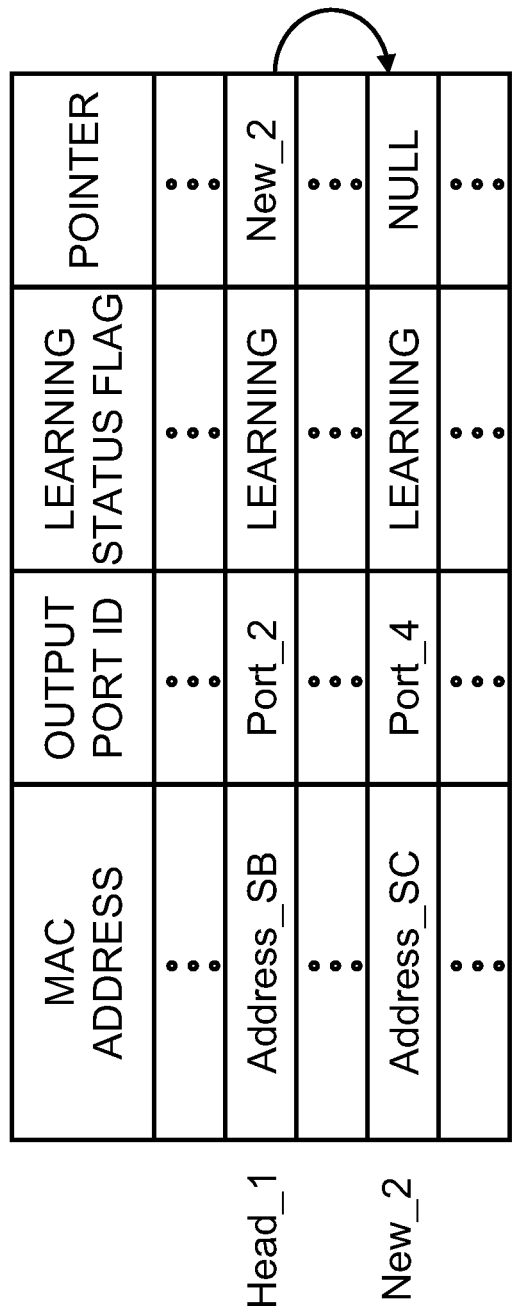
FIG. 15 is a diagram illustrating an example of a state of an FDB and a tag storage in a process of address registration according to the present invention.

FIG. 15 is a diagram illustrating an example of a state of an FDB and a tag storage in a process of address registration according to the present invention. For example, as illustrated in FIG. 15, it is assumed that, in the entry at the index Head_1, the MAC address is Address_SB, the output port ID is Port_2, the learning status flag is "LEARNING", and the pointer stored in the corresponding field of the tag storage 113 is New_2.

Figure 16:
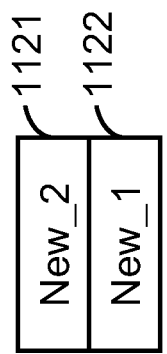
FIG. 16 is a diagram illustrating an example of a state of a top pointer storage and a bottom pointer storage in a process of address registration according to the present invention.

In operation S59, the switch management processor 120 instructs the manager 112 of the switch LSI 110 to set the top pointer stored in the top pointer storage 1121 to the value of the pointer (for example, the value of the corresponding field of the tag storage 113, New_2 in the above example) corresponding to the obtained entry (for example, the entry at the index Head_1). In this way, the top entry is switched to the next entry. FIG. 16 is a diagram illustrating an example of a state of a top pointer storage and a bottom pointer storage in a process of address registration according to the present invention. As illustrated in FIG. 16, an index New_2 is registered in the top pointer storage 1121. However, as in the case of the entry of the index New_2 in FIG. 15, when the value of the pointer corresponding to the obtained entry is "NULL", the switch management processor 120 instructs to set the top pointer to "NULL". This operation corresponds to a part of operation P5 in FIG. 3, and relates to operation S43 in FIG. 12. The switch management processor 120 advances the process to operation S61 in FIG. 14.

In operation S61, the switch management processor 120 performs a predetermined assessment (in other words, the address learning) by using data of the obtained entry. For example, the switch management processor 120 determines whether the data corresponds to a specific combination of address and VLAN. When the data corresponds to the specific combination of address and VLAN, the switch management processor 120 rejects the registration. There may be many variations of the assessment. For example, the switch management processor 120 may obtain not only the entry of the FDB 111 but also information of an internet protocol (IP) packet, and determines whether the registration should be performed or rejected on the basis of the obtained data. Such process is conventional and not the gist of the embodiment. Hence detailed discussion thereof is omitted.

In operation S63, the switch management processor 120 determines whether the SA (Address_SB in FIG. 15) of the assessment result in operation S61 should be registered.

Figure 17:
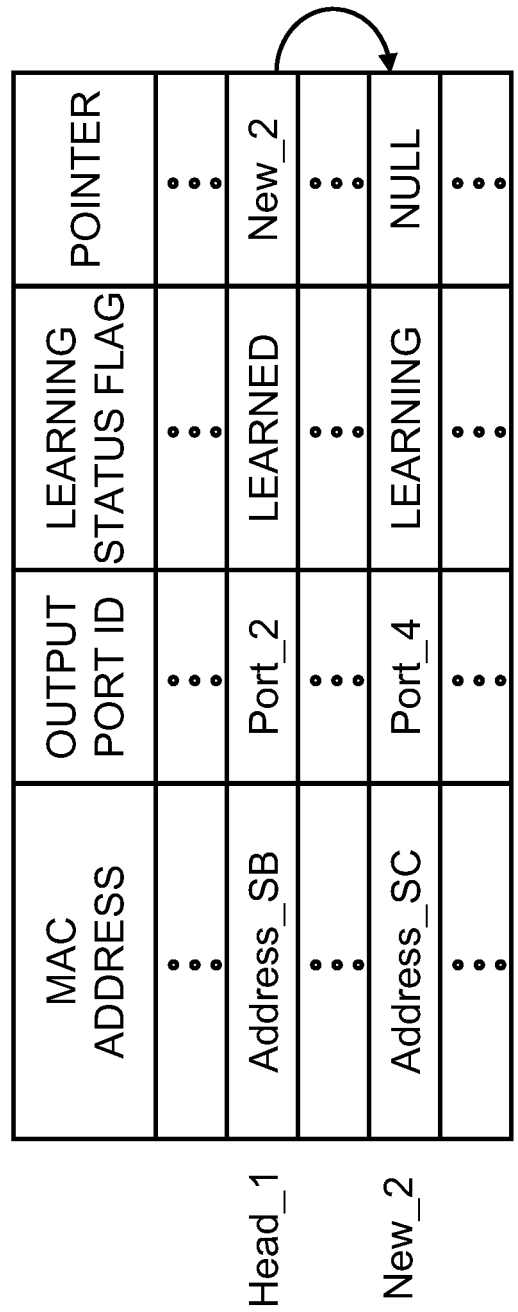
FIG. 17 is a diagram illustrating an example of a state of an FDB and a tag storage in a process of address registration according to the present invention.

In operation S65, when the SA should be registered ("Yes" in operation S63), the switch management processor 12 outputs to the manager 112 of the switch LSI 110 a request for updating an entry to change the learning status flag 1111 of the obtained entry (the entry at the index Head_1) to "LEARNED". This operation corresponds to operation P7 in FIG. 3, and relates to operation S49 in FIG. 12. Thereafter, the switch management processor 120 advances the process to operation S69. FIG. 17 is a diagram illustrating an example of a state of an FDB and a tag storage in a process of address registration according to the present invention. By performing operations discussed above, a state of the FDB 111 and the tag storage 113 changes from the state of FIG. 15 to the state of FIG. 17.

In operation S67, when the SA should not be registered ("No" in operation S63), the switch management processor 120 outputs to the manager 112 of the switch LSI 110 a request for deleting an entry to delete the obtained entry (the entry at the index Head_1). This operation corresponds to operation P7 in FIG. 3. Thereafter, the switch management processor 120 advances the process to operation S69.

In operation S69, the switch management processor 120 determines whether the top pointer holds "NULL". It is determined by whether the switch management processor 120 has instructed the manager 112 of the switch LSI 110 to set the top pointer to "NULL" in operation S59. When the top pointer does not hold "NULL" ("No" in operation S69), the switch management processor 120 returns the process to operation S51 in FIG. 13.

Figure 18:
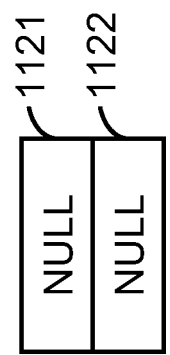
FIG. 18 is a diagram illustrating an example of a state of a top pointer storage and a bottom pointer storage in a process of address registration according to the present invention.

In operation S71, when the top pointer holds "NULL" ("Yes" in operation S69), the switch management processor 120 instructs the manager 112 of the switch LSI 110 to the bottom pointer set to "NULL". In this way, a state in which there is no entry to be learned in the queue of the switch LSI 110 is established. FIG. 18 is a diagram illustrating an example of a state of a top pointer storage and a bottom pointer storage in a process of address registration according to the present invention. In other words, as illustrated in FIG. 18, "NULL" is registered in both the top pointer storage 1121 and the bottom pointer storage 1122 of the manager 112. This operation corresponds to operation S45 in FIG. 12. Thereafter, the switch management processor 120 returns the process to operation S51 in FIG. 13.

By performing operations discussed above, the address learning is appropriately performed from the top entry of the queue in the switch LSI 110. Furthermore, the queue is appropriately updated, and when there are entries to be learned, the address learning is sequentially performed for the entries.

Figure 19:
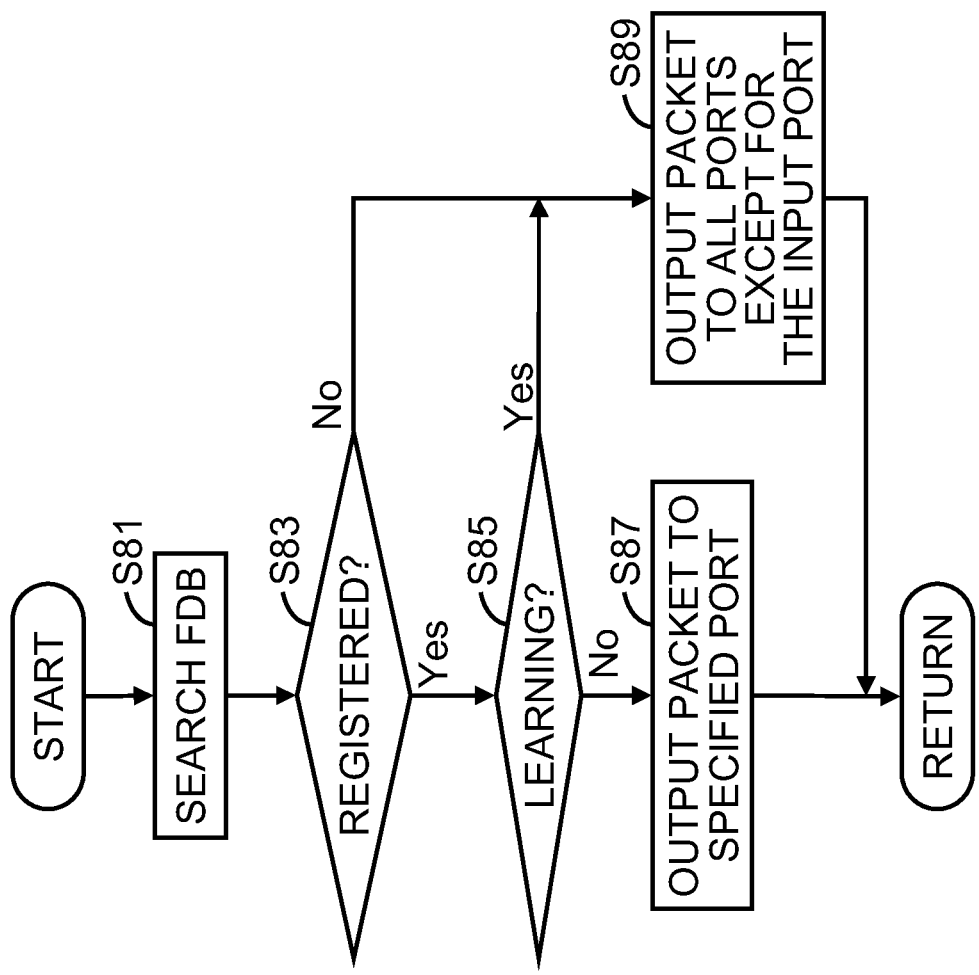
FIG. 19 is a diagram illustrating an example of an operation flow of a DA process according to the present invention.

FIG. 19 is a diagram illustrating an example of an operation flow of a DA process according to the present invention. The DA process will be discussed with reference to FIG. 19.

In operation S81, the switch LSI 110 searches the FDB 111 by the DA of the received packet.

In operation S83, the switch LSI 110 determines whether the DA of the received packet has been registered in the FDB 111.

In operation S89, when the DA has not been registered in the FDB 111 ("No" in operation S83), the switch LSI 110 transfers the packet to all the ports except for the port which has received the packet since it is difficult to know a port to which the device identified with the DA is connected. Thereafter, the switch LSI 110 returns the process to the operation flow illustrated in FIG. 6.

In operation S85, when the DA has been registered in the FDB 111 ("Yes" in operation S83), the switch LSI 110 determines whether the learning status flag 1111 of the entry including the DA indicates "LEARNING". When the learning status flag 1111 indicates "LEARNING" ("Yes" in operation S85), it has not been determined whether the address should be registered, and there may be a device to receive the packet at another port. Therefore, the switch LSI 110 advances the process to operation S89, and transfers the packet to all the ports except for the port which has received the packet.

In operation S87, when the learning status flag 1111 indicates "LEARNED" ("No" in operation S85), the switch LSI 110 outputs the packet to the output port included in the entry. The entry is available when the learning status flag 1111 indicates "LEARNED", so that the packet may be output in this way. Thereafter, the switch LSI 110 returns the process to the operation flow illustrated in FIG. 6.

By performing operations discussed above, the switch LSI 110 transfers the packet to all the ports to cause devices connected to the ports to determine whether to receive the packet when the DA has not been registered in the FDB 111 as "LEARNED".

By appropriately managing the learning status flag 1111 as discussed above, redundant address learning may be efficiently filtered, and nonperformance against the request for learning an address is avoided by appropriately managing the queue even when the processing speed of the switch management processor 120 is low. In other words, by adding a minimum resource of the learning status flag 1111 and the tag storage 113, efficient address learning may be achieved, and the nonperformance may be avoided. In this way, even when sophisticated address learning is performed by the switch management processor 120, impact on the performance due to the address learning may be suppressed to be very small.

Although the embodiment of the present technique has been discussed so far, the present technique is not limited to this.

For example, the configuration illustrated in FIG. 3 is an example, and the switch LSI 110 and the switch management processor 120 may be integrated together. Even in such a case, the embodiment may operate. In a case where the switch LSI 110 and the switch management processor 120 are separate hardware modules, the embodiment is especially effective because of latency issues.

The pointer corresponding to an entry may be integrated into the table, or may be held in a different memory or a different recording area. When the pointer is integrated into the table, operations become simpler and efficiency of memory usage becomes higher.

Regarding the operation flows, the sequence of the operations may be changed and the operations may be performed in parallel unless the operation result changes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network connection device, comprising:
a processor for executing a management program for performing a process of learning a specified address; and
a switch configured to
output a packet received from a primary port out of plural ports to a secondary port,
manage a table capable of storing an entry, the entry including a specific address of a specific device connected to a specific port out of the plural ports,
status data indicating whether the specific address has been learned, and
an identifier of the specific port,
generate a first entry of the table in the absence of a first address in the table,
the first address being included as a source address in a first packet received from a first port,
the first entry including
the first address,
first status data indicating that the processor is learning the first address, and
a first identifier of the first port,
request the processor to learn the first address in the absence of the first address in the table,
withhold requesting the processor to learn a second address upon receiving a second packet from the first port,
the second packet including the second address as a source address,
the second address being included, along with second status data indicating that the processor is learning the second address, in a second entry of the table, and
update the first status data to indicate that the processor has learned the first address, in response to a request from the processor.

2. The network connection device according to claim 1, wherein
the switch outputs a third packet to each of the plural ports other than the first port upon receiving the third packet from the first port,
the third packet including a third address as a destination address,
the table having a third entry, the third entry including
the third address and third status data indicating that the processor is learning the third address.

3. The network connection device according to claim 1, wherein
the switch controls a sequence of learning addresses each of which is included in an entry along with status data indicating that the processor is learning the each of the addresses.

4. The network connection device according to claim 3, wherein
the switch further manages a successor pointer corresponding to an entry including an address to be learned, the successor pointer pointing to an entry including an address to be learned next, and
the switch holds a top pointer and a bottom pointer,
the top pointer pointing to an entry including an address to be learned first,
the bottom pointer pointing to an entry including an address to be learned last.

5. A method for learning an address, the method being executed by a network connection device including a processor and a switch, the processor executing a management program for performing a process of learning a specified address, the switch outputting a packet received from a primary port out of plural ports to a secondary port, the switch managing a table capable of storing an entry, the entry including a specific address of a specific device connected to a specific port out of the plural ports, status data indicating whether the specific address has been learned, and an identifier of the specific port, the method comprising:
generating, by the switch, a first entry of the table in the absence of a first address in the table, the first address being included in a first packet received from a first port as a source address,
the first entry including
the first address,
first status data indicating that the processor is learning the first address, and
a first identifier of the first port;
requesting the processor to learn the first address in the absence of the first address in the table;
withholding requesting the processor to learn a second address upon receiving a second packet from the first port,
the second packet including the second address as a source address,
the second address being included, along with second status data indicating that the processor is learning the second address, in a second entry of the table; and
updating the first status data to indicate that the processor has learned the first address, in response to a request from the processor.

6. The method according to claim 5, wherein the switch manages a successor pointer corresponding to an entry including an address to be learned, the successor pointer pointing to an entry including an address to be learned next, wherein the switch manages a top pointer and a bottom pointer, the top pointer being for holding a top index to point to a top entry including an address to be learned first, the bottom pointer being for holding a bottom index to point to a bottom entry including an address to be learned last; the method further comprising:

setting the successor pointer corresponding to the bottom entry to an index of the first entry when the bottom pointer holds the bottom index;
setting the bottom pointer to the index of the first entry;
outputting the top pointer in response to a request from the processor;
outputting data included in the top entry in response to a request from the processor; and
setting the top pointer to the successor pointer corresponding to the top entry in response to a request from the processor.

7. A switching circuit device for outputting a packet received from a primary port out of plural ports to a secondary port, the switching circuit device comprising:

a storage for storing a table capable of storing an entry, the entry including
a specific address of a specific device connected to a specific port out of the plural ports,
status data indicating whether the specific address has been learned by a processor for executing a management program for performing a process of learning a specified address, and
an identifier of the specific port; and
a manager configured to
generate a first entry of the table in the absence of a first address in the table,
the first address being included as a source address in a first packet received from a first port,
the first entry including
the first address,
first status data indicating that the processor is learning the first address, and
a first identifier of the first port,
request the processor to learn the first address in the absence of the first address in the table,
withhold requesting the processor to learn a second address upon receiving a second packet from the first port,
the second packet including the second address as a source address,
the second address being included, along with second status data indicating that the processor is learning the second address, in a second entry of the table, and
update the first status data to indicate that the processor has learned the first address, in response to a request from the processor.

* * * * *